United States Patent [19]

Victoria et al.

[11] Patent Number: 5,515,955
[45] Date of Patent: May 14, 1996

[54] TORQUE CONVERTER LOCKUP CLUTCH CONSTRUCTION AND FABRICATION METHOD

[75] Inventors: Alfred B. Victoria, Warren; Joseph A. Szuba, Dearborn; Philip P. Chan, Novi; William Hale, Dearborn; Susan P. Hayward, Belleville, all of Mich.

[73] Assignee: Ford Motor Company, Dearborn, Mich.

[21] Appl. No.: 279,611

[22] Filed: Jul. 25, 1994

[51] Int. Cl.⁶ ................................................ F16H 45/02
[52] U.S. Cl. ........................................ 192/3.28; 192/70.2
[58] Field of Search ................... 192/3.28, 3.29, 192/70.2

[56] References Cited

U.S. PATENT DOCUMENTS

| | | | |
|---|---|---|---|
| 2,920,728 | 1/1960 | Förster | 192/3.29 |
| 3,915,272 | 10/1975 | Maurice | 192/70.2 |
| 4,153,147 | 5/1979 | Chana | 192/3.28 |
| 4,593,803 | 6/1986 | Valier | 192/112 |
| 4,785,924 | 11/1988 | Jäckel | 192/3.29 |
| 4,821,855 | 4/1989 | Jäckel | 192/3.29 |
| 4,944,374 | 7/1990 | Casse et al. | 192/3.29 |
| 4,945,782 | 8/1990 | Farrell | 74/431 |
| 4,969,544 | 11/1990 | Fujimoto | 192/3.29 |
| 5,211,270 | 5/1993 | Tamura et al. | 192/3.29 |
| 5,407,041 | 4/1995 | Fukunaga et al. | 192/3.29 |

FOREIGN PATENT DOCUMENTS 0193966  11/1983  Japan.

*Primary Examiner*—Rodney H. Bonck
*Attorney, Agent, or Firm*—Frank G. McKenzie; Roger L. May

[57] ABSTRACT

A lockup clutch assembly and fabrication method for a hydrokinetic torque converter comprising a high capacity piston and clutch assembly located within the cover of the hydrokinetic torque converter, the piston and clutch assembly comprising a first friction disc and a second friction disc connected drivably to the torque input member of a multiple ratio geared transmission and a third friction disc situated between the first and second friction discs and connected to the cover of the torque converter, the second friction disc being adapted to engage a friction surface on the cover when a pressure differential across the piston and clutch assembly is created in the torque converter, the driving connection between the third disc and the cover being achieved by interlocking spline teeth or embossments which permit torque transfer from the cover through the piston and clutch assembly while accommodating relative axial displacement between them whereby a direct drive torque transfer path is established with minimum backlash and improved torque transmitting capacity.

4 Claims, 4 Drawing Sheets

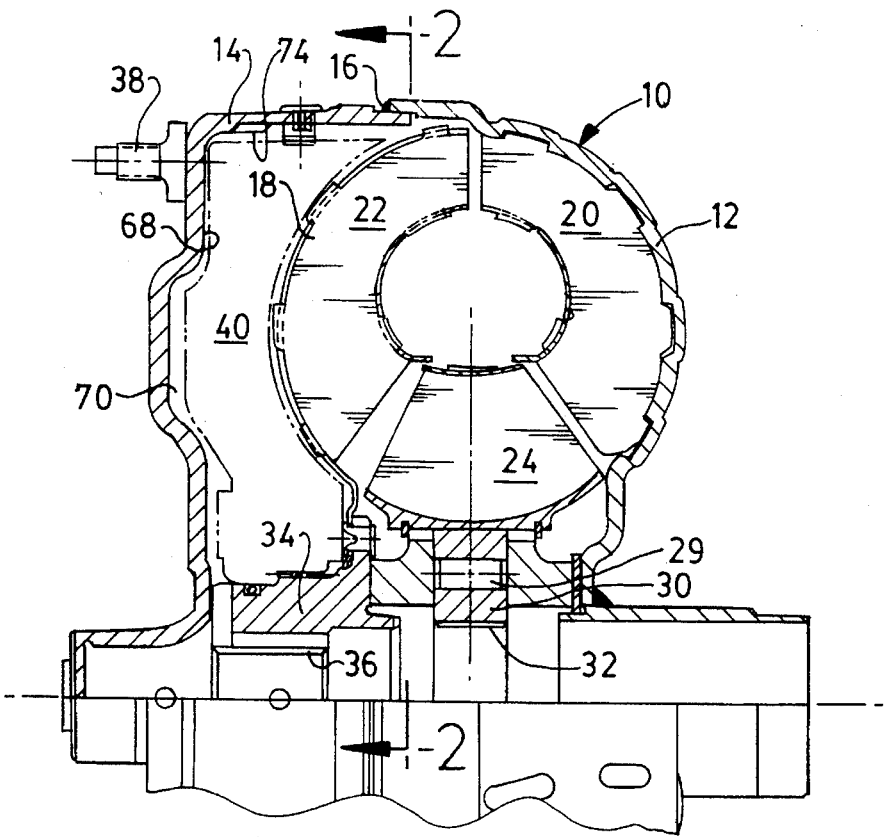
FIG-1
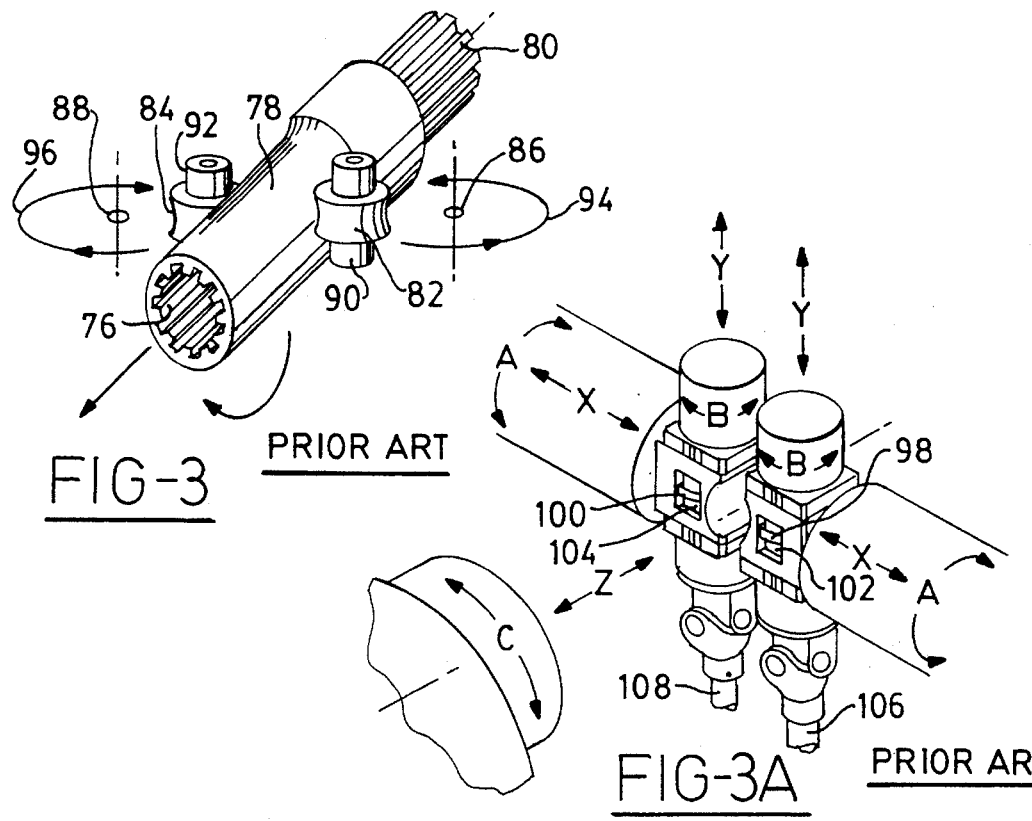
FIG-3 PRIOR ART
FIG-3A PRIOR ART

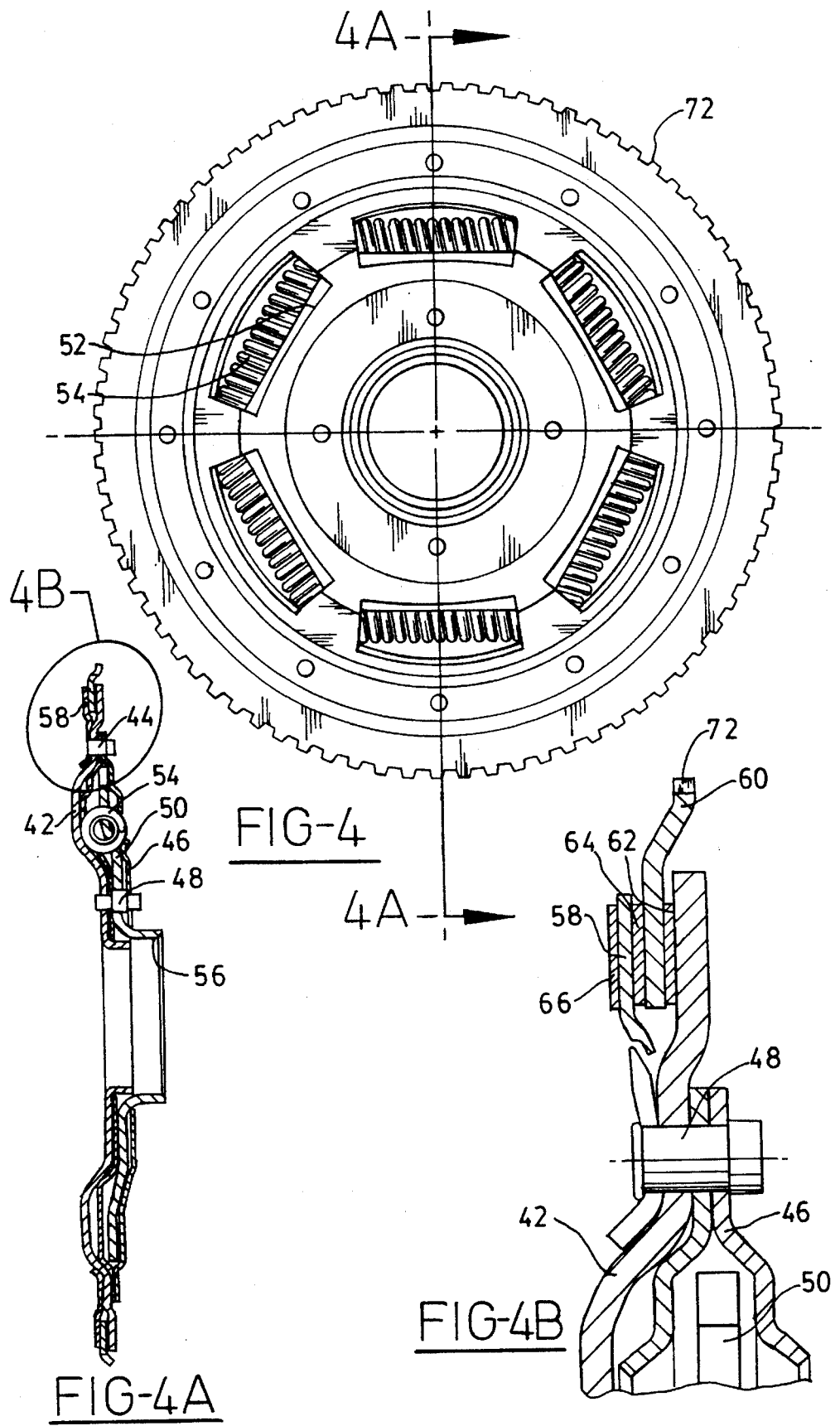

TORQUE CONVERTER LOCKUP CLUTCH CONSTRUCTION AND FABRICATION METHOD

TECHNICAL FIELD

The invention relates to hydrokinetic torque converters for use in automotive vehicle automatic transmissions and to improvements in the design and manufacture of a lockup clutch assembly for securing the torque converter impeller to the torque converter turbine.

BACKGROUND OF THE INVENTION

In a hydrokinetic torque converter transmission for an engine driven automotive vehicle, the transmission may include a torque converter having an impeller that encloses a turbine and a hydrokinetic reactor. The turbine and the impeller have flow directing blades that create a torque flow path through the torque converter by controlling the direction of the torus fluid flow in the converter. The impeller is connected to the engine and the turbine is connected to torque input elements of the transmission.

It is known design practice to establish a torque flow path through a lockup clutch assembly which bypasses the hydrokinetic torque flow path of the converter. The lockup clutch assembly comprises a friction surface on a torque converter cover and an axially movable piston assembly, the latter carrying a friction surface that engages the torque converter cover friction surface when a pressure differential is created across the lockup clutch assembly.

The torque transmitting capacity of the clutch can be increased by including within the clutch assembly an auxiliary friction disc between the piston assembly and the friction disc connected to the torque converter cover. An example of a high capacity clutch of this kind is shown in U.S. Pat. No. 4,821,855.

The auxiliary disc in the design of the '855 patent is carried by the torque converter cover, but relative axially shifting movement is permitted. The connection between the auxiliary disc and the torque converter cover is obtained by multiple brackets secured to the interior of the torque converter cover. The brackets drivably engage radially disposed bracket fingers or tabs carried by the auxiliary disc.

The mechanical driving connection established by the brackets and the bracket tabs causes impact problems due to the tangential gaps between the mating elements of the driving connection. This may result in fractured tabs. It also may result in undesirable brinelling and shear of the brackets. Further, excessive noise, vibration and harshness are problems that may be associated with a design of this kind since an undesirable degree of backlash, of necessity, will exist between the tabs and the brackets carried by the torque converter cover.

Manufacture of clutches of this kind, furthermore, creates fabrication problems because of the necessity for welding or otherwise securing the brackets to the interior of the torque converter cover. This requires special welding fixtures. Furthermore, it is difficult, using welding techniques, to locate the brackets angularly with precision so that uniform loading of the brackets and the tabs is achieved.

Japanese Patent Publication No. 58-193966, dated Nov. 11, 1983, deals in part with the backlash problem in a conventional clutch construction wherein a single clutch disc surface of a torque converter clutch is adapted to engage a single friction surface on the torque converter cover. The damper plate for a clutch construction of this kind is connected to the clutch disc portion of the assembly through a pawl drive, which includes a spring plate located in a slot that receives a driving pawl. The spring plate eliminates or reduces backlash, but such a construction is not adaptable for a high capacity clutch of the kind used with the present invention.

Brief Description of the Invention

Unlike the designs of the prior art teachings, the present invention comprises a high capacity, multiple disc, friction clutch assembly for a torque converter in an automotive vehicle driveline wherein a friction disc is secured to the torque converter cover by a spline drive that does not require the use of welded brackets or spring-loaded tabs. It includes spline teeth or embossments formed on the torque converter cover. Mating spline teeth are formed on the periphery of the auxiliary friction disc for the lockup clutch assembly.

Internal splines in the torque converter cover engage external splines on the friction disc assembly, thereby providing a robust torque transfer driving connection between the engine and the torque input element of the transmission when the clutch assembly is engaged, thus establishing a torque flow path that bypasses the hydrokinetic torque flow path of the torque converter. The embossments or the internal splines on the torque converter cover are formed by a cold metal forming operation. One suitable cold forming operation is sometimes referred to as the Grob process. Registering external spline teeth or projections on the clutch assembly are precision formed, thereby providing precision engagement of the torque converter cover spline teeth or embossments and the friction clutch teeth or projections. This eliminates backlash problems associated with prior art designs. It also eliminates the assembly problems associated with properly orienting the angular position of the clutch assembly with respect to the impeller housing.

Impact loads of the cooperating spline teeth or embossments are reduced because of the reduced backlash due to the precision tolerances that are achieved. The number of parts in the assembly is significantly reduced and the associated cost is lessened because of the elimination of the need for torque transmitting brackets and spring tabs. In addition, a heat treat process has been eliminated due to lower load distributions carried by each tooth on the spline. Stamping dies for forming the interlocking elements of the torque converter cover and the clutch assembly are not required since the manufacturing steps in forming the driving connection between the torque converter cover and the clutch disc assembly involve only cold metal forming using roller heads that employ rotary inertia mass rather than a high force extrusion press.

BRIEF DESCRIPTION OF THE DRAWINGS

FIG. 1 is a partial cross-sectional view of a hydrokinetic torque converter including an impeller and a turbine, together with a torque converter cover that is adapted to receive a high capacity lockup clutch assembly.

FIG. 3 is a schematic representation of a prior art cold rolling machine for producing internal splines in a hollow member.

FIG. 3A is a schematic representation of a prior art cold rolling machine using movable roller heads that are adapted to create internal spline teeth on the periphery of cylindrical member.

FIG. 4 is an end view of a piston assembly adapted to be located in the torque converter cover of the converter shown in FIG. 1.

FIG. 4A is a cross-sectional view seen from the plane of section line 4A—4A of FIG. 4.

FIG. 4B is an enlarged view of the outer peripheral portion of the assembly of FIG. 4A.

PARTICULAR DESCRIPTION OF THE INVENTION

Figure 2:
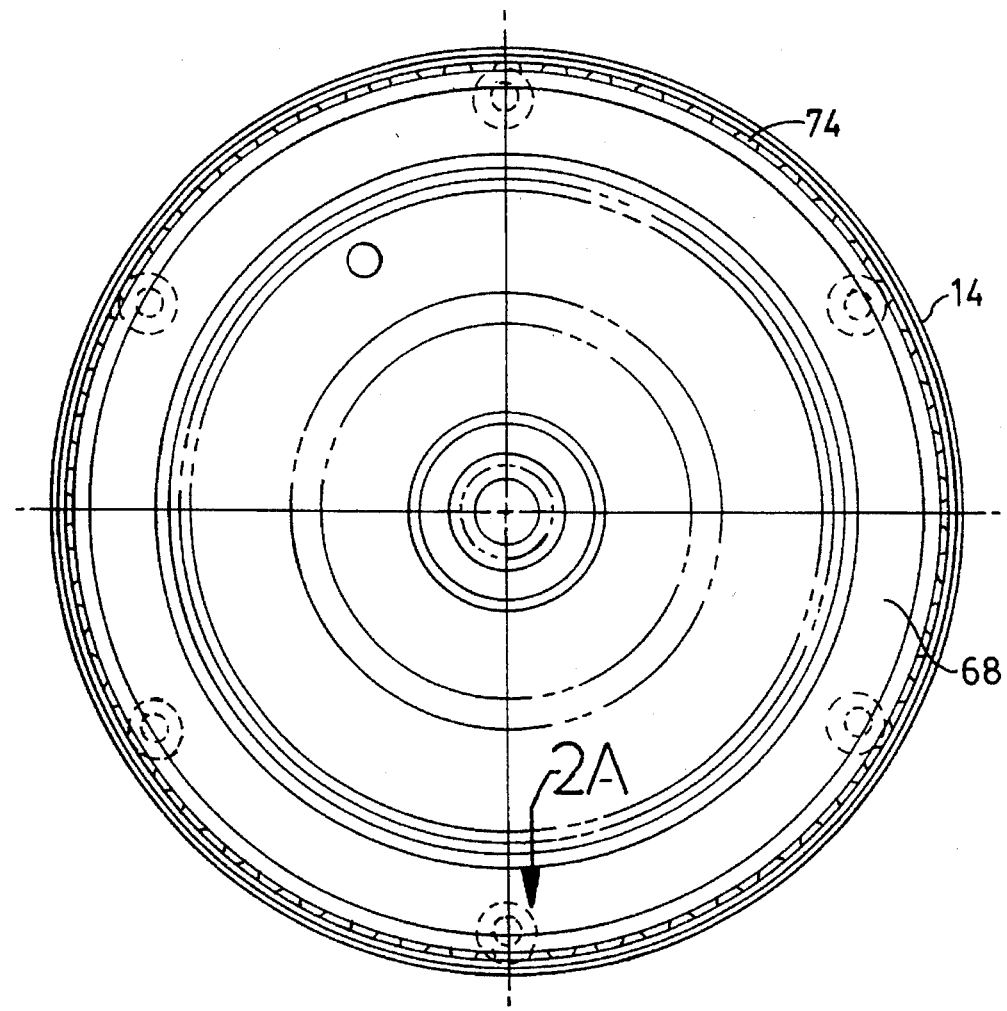
FIG. 2 is a cross-sectional view as seen from the plane of section line 2—2 of FIG. 1 showing the internal spline teeth of the torque converter cover.

In FIG. 1, numeral 10 designates generally the impeller of a hydrokinetic torque converter. It includes a torus housing portion 12 and a drum-shaped cover portion 14 secured together by welding at 16 to form a closed torque converter assembly. A turbine 18 is situated in the impeller housing in toroidal fluid flow relationship with respect to the impeller. Impeller blades 20 establish toroidal fluid out-flow passages that are in fluid communication with toroidal in-flow passages defined by turbine blades 22. Stator blades 24 are situated in the usual fashion between the flow exit section of the turbine blades 22 and the flow entrance section of the impeller blades 20.

Stator blades 24 are mounted on an overrunning brake 29 having an inner race 30 splined at 32 to a stationary sleeve shaft. The overrunning brake includes rollers, as shown, which establish a locking action to prevent rotation of the stator blades in one direction but permitting free wheeling motion in the opposite direction.

Turbine 18 includes a turbine hub 34 which has splines 36 to establish a driving connection with a torque input shaft (not shown) for a multiple ratio gear transmission.

The drum-shaped cover portion 14 is adapted to be connected by drive pins 38 to a drive plate (not shown), which is secured to the crankshaft of an internal combustion engine.

A cavity 40 is situated between the outer shell of the turbine 18 and the inner surface of the cover drum portion 14. Only the outline of the clutch assembly is shown in FIG. 1. The actual clutch assembly will be described with reference to FIGS. 2, 2A and FIGS. 4 through 6.

As seen in FIGS. 4 and 4A, a piston plate 42 is adapted to be connected by rivets or drive pins 44 to clutch cover plate 46. The plate 42 is connected to spacer 48 which joins the plate 42 with the plate 46. Situated between the plate 42 and the plate 46 is a damper plate 50 formed with peripherally spaced spring pockets 50 which receive damper springs 54. These are positioned as shown in the cross-sectional view of FIG. 4. As seen in FIG. 4A, the springs 54 are seated on the peripherally spaced ends of the openings 52. When torque is applied to the clutch plates 42 and 46, it is distributed through the springs to the damper plate 50, the latter being splined at 56 to the torque input shaft.

A peripheral disc 58 is secured to the piston plate 42 with the rivets 44, as seen in FIG. 4A as well as in the enlargement of FIG. 4B. Situated between the peripheral disc 58 and the piston plate 42 is a friction disc 60. Friction material 62 is located between friction disc 60 and piston plate 42, and friction material 64 is located between peripheral disc 58 and piston disc 60. The friction material 62 can be carried by either the piston disc 60 or the plate 42. Similarly, friction material 64 can be carried by the disc 60 or the disc 58. Friction material 66 is carried by the disc 58 and is adapted to engage the friction clutch surface 68 formed in the interior of the cover drum 14, as seen in FIG. 1.

When the clutch assembly is located within the torque converter cover, as shown in phantom lines in FIG. 1, a clutch release chamber 70 is formed between the drum 14 and the clutch assembly. When the pressure behind the turbine shell exceeds the pressure in the release chamber 70, the clutch assembly is energized, thereby establishing a torque flow path around the hydrokinetic units whereby the crankshaft is connected directly to the torque input elements of the multiple ratio transmission. The mechanical torque flow path is established in part by spline teeth 72 formed in the disc 60, as seen in FIGS. 4, 4A and 4B. These spline teeth engage internal spline teeth 74 formed in the interior of the torque converter cover drum 14, as seen in FIG. 1.

As seen in FIG. 2, the internal teeth 74 in the drum 14 are spaced throughout the periphery of the drum. Teeth 74 register with the teeth 72 to permit torque transfer from the drum to the clutch assembly. Teeth 74 and 72 accommodate axial shifting movement of the clutch plate with respect to the drum.

Figure 2A:
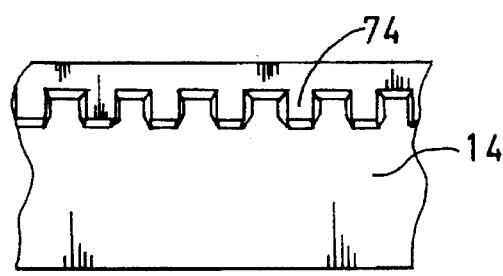
FIG. 2A is a radial view as seen from the vantage point 2A of FIG. 2.

FIG. 2A shows an enlargement of a portion of the internal teeth shown in FIG. 2 and in FIG. 1.

The spline teeth are formed by a cold forming process using apparatus of the kind schematically illustrated in FIGS. 3 and 3A. FIG. 3A shows in schematic form a prior art device for forming internal spline teeth 76 on a hollow tubular member 78. It involves placing the tubular member over forming die 80 on which are formed external spline teeth. Rotary die heads 82 and 84 are rotated about their respective axes 86 and 88. They are carried by stub shafts 90 and 92, respectively.

When the roller heads follow the orbital motion pattern shown by directional arrows 94 and 96, the roller heads 82 and 84, respectively, impact the hollow workpiece, thereby dynamically forging the material of the hollow workpiece and forming internal spline teeth whose geometry is determined by the geometry of the external teeth 80 of the central die. The same concept is used on an apparatus of the kind shown in FIG. 3A, where the roller heads are formed with spline tooth forming portions 98 and 100 formed on roller heads 102 and 104, respectively. The splined tooth forming portions 98 and 100 displace the metal into the spline tooth spaces of the internal die, also called the mandrel. At the same time, metal flows in an axial direction, thereby causing the axial length of the workpiece to grow or increase as the metal is displaced radially.

Although the apparatus shown in FIG. 3 and the apparatus shown in FIG. 3A are not adaptable, in the form that has been illustrated, for forming internal spline teeth in an torque converter cover of the kind illustrated in FIG. 1 and in FIG. 2, the same principles may be applied. The drum portion 14 can be mounted by specially designed holding fixtures, not shown, which would correspond to the holding fixtures for the workpieces of FIGS. 3 and 3A. That is, roller heads can be mounted for rotation about the Y axes illustrated in FIG.

3A so that the roller heads will impact the outer periphery of the drum portion 14 and displace metal inward to form the teeth 74 as the workpiece is fed toward the roller heads in the direction of the Z axis illustrated in FIG. 3A. The drum can be indexed in the direction indicated by the symbol "C" in FIG. 3A so that the teeth 74 can be formed about the entire periphery.

After each tooth is formed with the impact energy of the rotary die heads, it is indexed in synchronism with the movement of the die heads in the direction of the X axes illustrated in FIG. 3A. The die heads are rotated in their orbital patterns by a pair of driveshafts of the kind shown at 106 and 108 in FIG. 3A. These are connected to the die heads by means of universal joints, as illustrated, which rotate the die heads in the direction indicated by the directional arrows "B" in FIG. 3A.

The starting workpiece for the cold forming of the spline teeth can be generally shaped as a flat plate. The inertial cold forming operation then may be initiated on the peripheral portion of the workpiece. The peripheral drum portion of the cover drum then would be cold formed by the same cold forming steps used during the cold forming of the spline teeth. This results in a positioning of the spline teeth radially outward of the radius formed between the inner surface of the drum portion and the radial surface 68, as seen in FIG. 1.

Tooling for cold forming workpieces of the kind described in this specification is manufactured by Ernst Grob AG of Switzerland. A cold forming process suitable for practicing an invention is referred to in the industry as the Grob cold-rolling method.

Figures 5, 5A, 6:
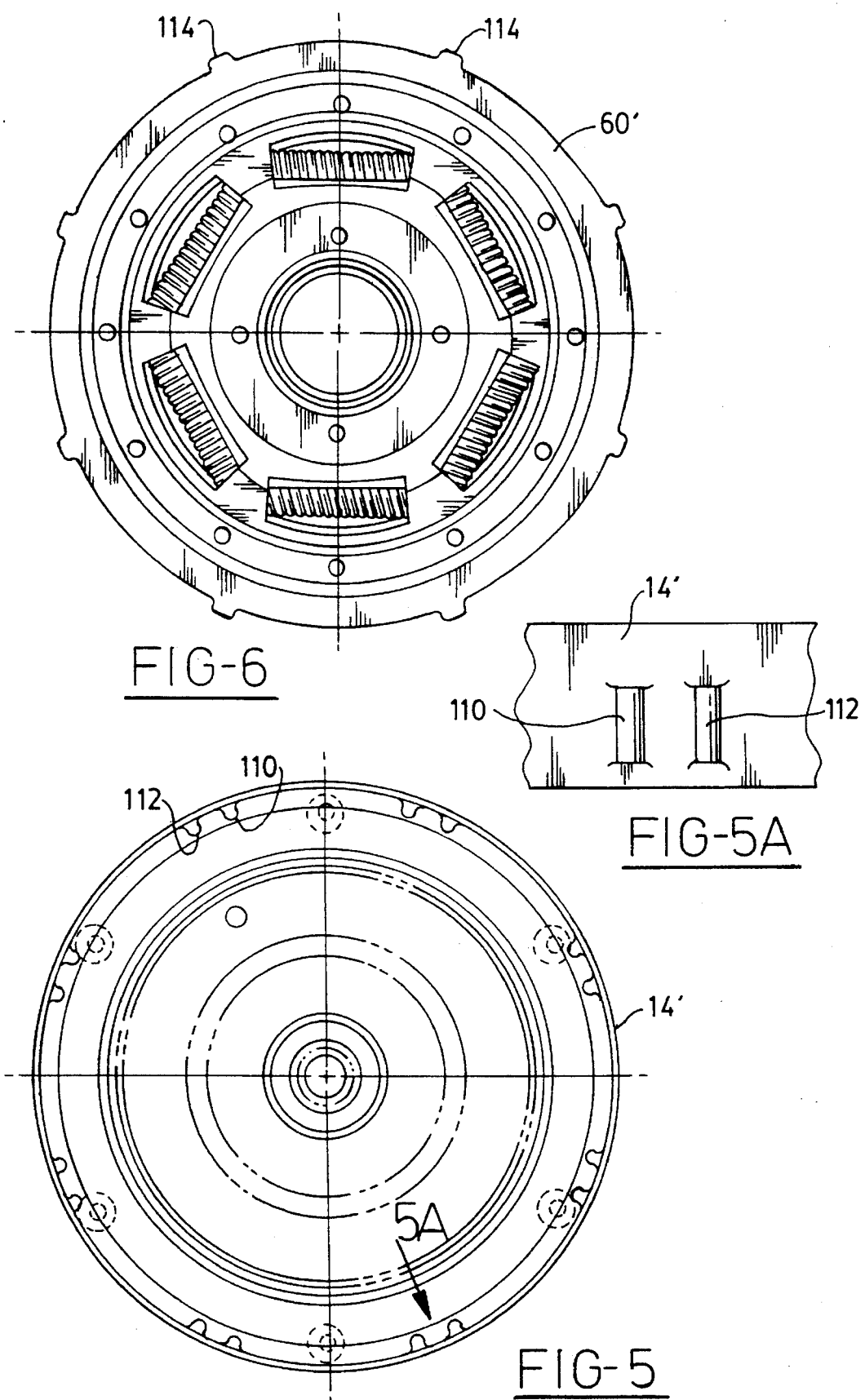
FIG. 5 is a view similar to the view of FIG. 2 showing an alternative embossment pattern on the periphery of the torque converter cover.
FIG. 5A is a view corresponding to FIG. 2A showing the internal embossments seen in FIG. 5 from a perspective in the direction of arrow 5A shown in FIG. 5.
FIG. 6 is an end view of the clutch assembly adapted to be located in the torque converter cover seen in FIG. 5.

FIGS. 5, 5A and 6 show an alternate embodiment of the invention. This includes the formation of internal embossments shown at 110 and 112 in FIG. 5 and in FIG. 5A. These embossments 110 and 112 are arranged in pairs on cover drum portion 14' as indicated in FIG. 5. The embossments may be formed by a precision stamping die. The spacing between the pairs of embossments receive projections 114 formed on the periphery of clutch disc 60' shown in FIG. 6. The projections correspond to the external teeth 72 of the clutch assembly shown in FIG. 4 and in FIG. 4B.

The torque transmitting capacity of the design of FIGS. 1, 2 and 4 is greater than that of the design of FIGS. 5 and 6 because of the increased number of spline teeth relative to the number of embossments of FIGS. 5 and 6. In either case, however, precision tolerances of the registering projections or internal spline teeth with respect to the external spline teeth or projections of the clutch assembly can be maintained because of the precision cold forming.

Because of the precision that can be achieved using our improved cold forming techniques, reduced backlash can be achieved. This reduces impact loads on the engageable elements of the cover housing and the clutch assembly. Furthermore, orientation of the clutch assembly with respect to the impeller cover during assembly is greatly simplified, thereby reducing manufacturing costs and assembly time.

We have found that conventional high-strength, low-alloy steel can be used for the cover housing since it is adaptable for cold forming using the inertia impact process or precision stamping. Clearances between the spline teeth and the clutch assembly and the internal teeth of the torque converter cover can be maintained within limits of plus or minus 0.0002 inches. A high degree of repeatability can be achieved for high volume manufacturing operations.

Unlike the prior art devices that require welded brackets within the interior of the cover housing, our improved design eliminates misalignment problems during assembly. The controlled and reduced backlash reduces both impact loads on the spline teeth and improves the noise vibration and harshness of the transmission. Further, since the low-alloy steel of which the cover housing is formed grows axially during the cold forming operation, there is an additional cost benefit because of the reduced amount of steel and the elimination of waste due to finish machining compared to prior art designs.

Having described preferred embodiments of our invention, what we desire to secure by U.S. Letters Patent is:

We claim:

1. A hydrokinetic torque converter and lockup clutch assembly comprising a torque converter cover adapted to be connected to a source of driving torque, a turbine mounted on a central axis in toroidal flow relationship with respect to said cover, said cover including a radial wall, said turbine being adapted to be connected to a driven member;

a friction disc clutch enclosed in said cover between said turbine and said radial wall;

said radial wall having a radially extending portion defining a radial friction clutch surface, a peripheral portion of said cover having an internal surface extending generally axially with respect to said central axis;

said peripheral portion being joined to said radially extending portion at a first radial location at said internal surface of said peripheral portion;

said friction disc clutch having multiple friction discs in axially stacked relationship, at least one of said friction discs being connected to and rotatable with said cover peripheral portion and the other friction discs of said friction disc clutch being connected to said driven member;

the connection between said cover peripheral portion and said one friction disc comprising internal projections formed integrally in and extending radially inward from said internal surface of said peripheral portion of said cover, said internal projections being located at a second radial location, said second radial location being radially outward of said first radial location, external projections extending radially outward from said one friction disc, said internal and external projections being engageable thereby defining with said friction disc clutch a torque flow path between said cover and said driven member when said friction discs are engaged.

2. A hydrokinetic torque converter and lockup clutch assembly for a transmission in a driveline for an engine-powered vehicle, said converter having an impeller assembly adapted to be connected to said engine and a turbine adapted to be connected to torque input portions of said transmission, said impeller assembly including a torque converter cover with a radial wall, said impeller assembly enclosing said turbine;

said cover having a peripheral portion with an internal surface, said radial wall defining a radial friction clutch surface, said peripheral portion being joined to said radial wall at a first radial location at said internal surface of said peripheral portion;

a multiple friction disc clutch assembly in said torque converter cover between said wall and said turbine, said clutch assembly including a first friction disc connected to said cover and at least one other disc connected to said torque input portions of said transmission;

the connection between said first friction disc and said cover comprising first projections in said cover extending radially inward toward said clutch assembly and second projections on the periphery of said first friction disc, said first projections being located at a second radial location, said second radial location being radially outward of said first radial location, said first and second projections being engageable to establish a torque transfer path between said first friction disc and said cover while accommodating axial displacement of said first friction disc relative to said cover.

3. The combination as set forth in claim 1 wherein said internal projections are cold formed internal spline teeth and said external projections are external spline teeth.

4. The combination as set forth in claim 2 wherein said first projections are cold formed internal spline teeth and said second projections are external spline teeth formed on the periphery of said first friction disc.

* * * * *